April 11, 1944.    T. M. GUNN    2,346,573

THERMOSTATIC ELEMENT

Original Filed Sept. 14, 1940

Townsend M. Gunn
Inventor
Haynes and Koenig
Attorneys

Patented Apr. 11, 1944

2,346,573

UNITED STATES PATENT OFFICE 2,346,573

THERMOSTATIC ELEMENT

Townsend M. Gunn, Attleboro, Mass., assignor to Metals & Controls Corporation, Attleboro, Mass., a corporation of Massachusetts Original application September 14, 1940, Serial No. 356,718. Divided and this application April 4, 1942, Serial No. 437,666

8 Claims. (Cl. 297—16)

This invention relates to thermostatic elements, and more particularly to composite thermostatic elements wound in the form of a helix, such as shown and described in Parsons Patent 2,121,259.

This application is a division of my copending application, Serial No. 356,718, filed September 14, 1940.

Among the objects of the invention may be noted the provision of a simple and compact thermostatic element such as shown in said Parsons patent, which has variable expansion characteristics; the provision of a thermostat which has varying operating characteristics dependent upon the temperatures to which it is subjected; the provision of such a thermostat which may be made to expand at relatively widely varying rates; the provision of a thermostat of the class described which expands at varying rates at different temperatures; and the provision of a thermostat of the class described which will operate only after a definite temperature is attained. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which are illustrated several exemplary embodiments of the invention, Fig. 1 is a plan view of one type of thermostat made in accordance with the present invention;

Similar reference characters indicate corresponding parts throughout the several views of the drawing.

The present invention refers to composite thermostat elements of the type shown and described in Parsons Patent No. 2,121,259, and to thermostats embodying these composite elements. An element of this type may be made by first winding a narrow strip of composite thermostatic metal, such as bimetal, into a helical form having a relatively small diameter. This minor helix is then wound as a second or major helical form of relatively large diameter, thus forming a compound or double helical thermostatic element, or a peripherally continuous operating member, as described in said Parsons Patent 2,121,259. The composite metal, or bimetal helix, or spring, so formed, will expand or contract lengthwise with change of temperature. The amount of movement for a given temperature change is controlled by the relation between the various dimensions of the element, and the direction of movement is controlled by the direction of the winding of the two helices and the relative position of the high and low expansion sides of the bimetal.

According to the present invention, a thermostatic element of the Parsons type is made by winding a single or minor helix into coils of a double or major helix at a predetermined temperature. This winding is done so that the major coils in the finished element just touch each other at a predetermined temperature. Coils of such a thermostatic element may be wound, for example, so that at 200° F. the coils just touch each other. If properly done, the winding may be done at the temperature at which it is desired to have the coils just touch. As the thermostat is cooled down to room temperature, there will be substantially no longitudinal movement of the coils, provided the operating characteristics of the thermostat are such that it expands upon heating. This lack of response is caused by the fact that the coils are unable to contract longitudinally, since they are already in contact because of their winding. Similarly, as coils prepared in this manner are heated to any temperature below this predetermined temperature, which in this case has been taken at 200° F., there will be no expansion of the coils, but only a release of the stress which was imposed as they were cooled down, until the set temperature is reached. After 200° F. has been attained, the normal expansion of the coils will take place. In this way, it is possible to prepare thermostatic elements of the Parsons type which will come into operation only at a predetermined temperature, and which will operate at controlled rates at temperatures above this point.

Figure 1:
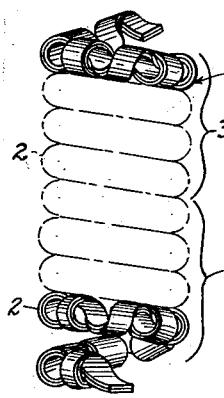
Figure 2:
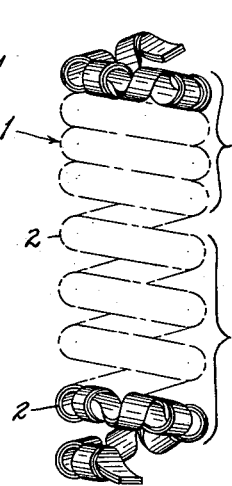
Fig. 2 is a plan view of the Fig. 1 thermostat at a different temperature.

Employing the above principle, a thermostatic element can be constructed which will have different rates of expansion at different temperatures. This is accomplished by winding different portions of the element in different ways. Such a thermostatic element is shown in Figures 1, 2 and 3. Fig. 1 shows a thermostatic element 1 formed from coils 2. The portion 3 of the thermostatic element has been wound, let it be assumed, at a temperature of 300° F. (so that the coils of portion 3 just touch at this temperature), while the portion 4 of the thermostat has been wound at a temperature of 200° F. so that the coils of portion 4 just touch at this temperature. Fig. 2 then represents the condition of the thermostatic element at a temperature of about 250° F. Portion 3 still has the coils pressed together, since all of the stress has not been relieved, and will not be until a temperature of 300° F. has been attained. The coils 2 of the portion 4, on the other hand, have expanded longitudinally since any stresses have been eliminated by increasing the temperature above that at which the coils start separating.

Figure 3:
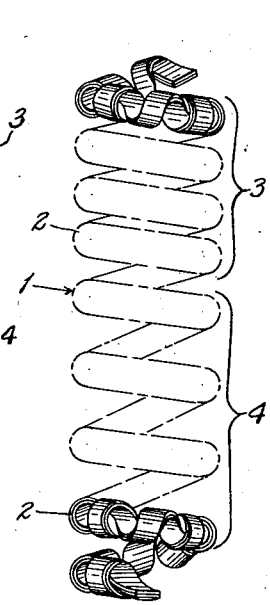
Fig. 3 is a plan view of the Fig. 1 thermostat at a still different temperature.

Fig. 3 shows the same thermostat at a higher temperature, such as 350° F. The coils 2 of the portion 3 of the thermostat have now likewise begun to expand, while the coils of the portion 4 have continued to expand. As a result, the movement of the complete thermostatic element 1 is, at this stage, the sum of the movements of all of the coils, while at the temperature shown in Fig. 3, the movement of the thermostatic element 1 is only the sum of the movements of the coils in the portion 4. From this it will be clear that the rate of expansion by the thermostat 1 changes as the winding temperature of a portion of the element is reached and exceeded.

Figure 4:
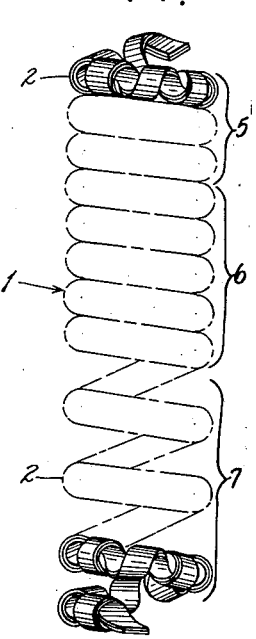
Fig. 4 is a plan view of another form of the invention.
Figure 6:
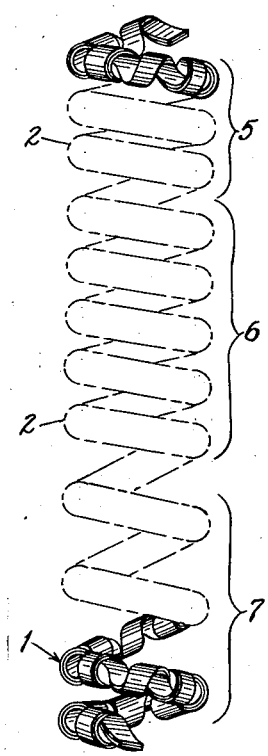
Fig. 6 is another plan view of the Fig. 4 thermostat at still another temperature; and, Fig. 7 is a plan view of a still further form of the invention.
Figure 5:
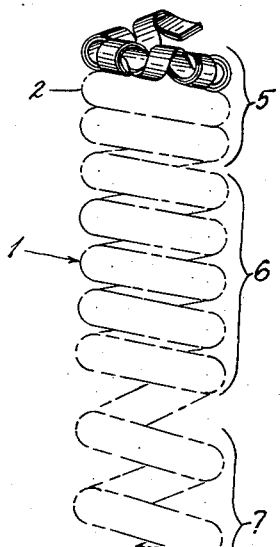
Fig. 5 is a plan view of the Fig. 4 thermostat at a different temperature.

Figures 4, 5 and 6 illustrate another embodiment of the present invention. The thermostat in this embodiment has been wound at three different temperatures. The portion 5 has been wound in the manner described above, for example, at 300° F., the portion 6 at 200° F., and the portion 7 at 100° F. Fig. 4 then represents the condition of the thermostatic element at a temperature above 100° F., but below 200° F., for example, 150° F. The coils of the portion 7 have begun to expand but the coils in portions 5 and 6 are still not moving longitudinally.

Fig. 5 represents the same thermostatic element at a higher temperature, for example, 250° F. The coils in the portion 5 are still stationary, but the coils in portion 6 have begun to expand and the coils in portion 7 have continued to do so. The expansion of the thermostatic element 1 is at this time the sum of the expansion of the coils in the portions 6 and 7 of the element, while in Fig. 4 it was the sum only of the coils in the portion 7.

Fig. 6 illustrates the condition of the coils at a still higher temperature, for example, 350° F. The coils in all three portions 5, 6 and 7 are now expanding longitudinally and the expansion of the thermostatic element 1 is now the sum of the expansions of all of the coils.

From the foregoing, it will be apparent that thermostatic elements may be formed with widely varying operating characteristics. The thermostic element may have as many rates of expansion as there are coils therein.

Figure 7:
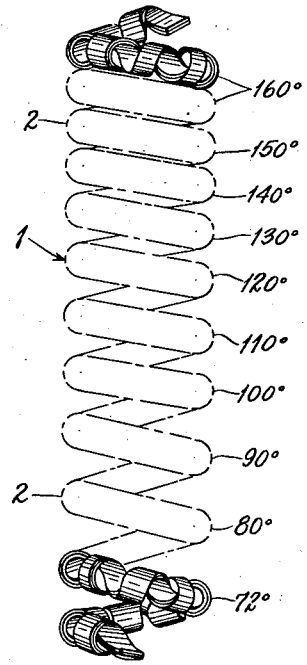

Fig. 7 represents such a thermostatic element. Here each of the coils has been wound, so as to touch, at a different temperature, as indicated on the drawing. Thus, the first coil was added at 160° F., the second at 150° F. etc., with the last wound at 72° F. Fig. 7 represents the condition of the element at 155° F. All of the coils except the last one are now expanding longitudinally and the rate of expansion of the complete element is the sum of the rates of expansion of all the coils, with the exception of the last one. However, the individual coils have expanded different distances, since they began such expansion only upon attainment of the respective temperatures at which they were wound.

It is clear of course that by reversing the position of the layers of composite metal, an element may be constructed which expands with decrease of temperature. Winding the coils of such an element so that they just touch at different temperatures will make a thermostatic element with different rates of expansion as the temperature decreases, which element may be formed to commence operation only upon decrease in temperature to a predetermined point.

The thermostatic elements of the present invention may, of course, be made in different ways. For example, the coils of the major helix may be wound at room temperature and the resulting element then heat-treated to give it the desired characteristics. The important factor is that the coils in the finished element shall just touch at a plurality of temperatures.

From the above it is clear that in Figs. 1–6 the coils are responsive to move in succession by groups, and in Fig. 7 that the coils move individually in succession. In the latter case, there is a closer approximation to a continuous change in rate of expansion with temperature change.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. A thermostatic element comprising a strip of composite laminated metal extending progressively about a first axis to form minor coils which in turn are extended progressively about a second axis to form major coils, a plurality of successive groups of said major coils, each group, at a predetermined temperature, having its coils spaced from each other a distance which is different for each successive group so that the said major coils of the respective groups come into contact with one another at more than one temperature.

2. A thermostatic element comprising a strip of composite laminated metal extending progressively about a first axis to form minor coils which in turn are extended progressively about a second axis to form major coils, a plurality of successive groups of said major coils, each group, at a predetermined temperature, having its coils spaced from each other a distance which is different for each successive group so that at least one and less than all of said major coils move in response to temperature change over only a part of the total temperature range to which the element will be subjected.

3. A thermostatic element comprising a strip of composite laminated metal extending progressively about a first axis to form minor coils which in turn are extended progressively about a second axis to form major coils, a plurality of successive groups of said major coils, each group, at a predetermined temperature, having its coils spaced from each other a distance which is different for each successive group so that said major coils of the respective groups begin to move apart at a plurality of predetermined temperatures.

4. A thermostatic element comprising a strip of composite laminated metal extending progressively about a first axis to form minor coils which in turn are extended progressively about a second axis to form major coils, a plurality of successive groups of said major coils, each group, at a predetermined temperature, having its coils spaced from each other a distance which is different for each successive group so that at least one and less than all of said major coils respond, in a direction parallel to said second axis, to a temperature change over only a part of the total temperature range to which the element will be subjected.

5. A thermostatic element comprising a strip of composite laminated metal extending progressively about a first axis to form minor coils which in turn are extended progressively about a second axis to form major coils, a plurality of successive groups of said major coils, each group, at a predetermined temperature, having its coils spaced from each other a distance which is different for each successive group so that said major coils in the respective groups begin to move in a direction parallel to said second axis only at a plurality of predetermined temperatures.

6. A thermostatic element comprising a strip of composite laminated metal extending progressively about a first axis to form minor coils which are in turn extended progressively about a second axis to form major coils, at least one of the major coils at a predetermined temperature being spaced apart from an adjacent major coil a distance which is different from that between another major coil and its adjacent major coil.

7. A thermostatic element comprising a strip of composite laminated metal extending progressively about a first axis to form minor coils which are in turn extended progressively about a second axis to form major coils, a plurality of the major coils being spaced apart a given distance at a predetermined temperature and another plurality of said major coils being spaced apart a different distance at said temperature.

8. A thermostatic element comprising a strip of composite laminated metal extending progressively about a first axis to form minor coils which are in turn extended progressively about a second axis to form major coils, directly adjacent ones of said major coils being spaced apart at a predetermined temperature a distance which is different for each adjacent pair of said coils.

TOWNSEND M. GUNN.